United States Patent Office 3,364,010
Patented Jan. 16, 1968

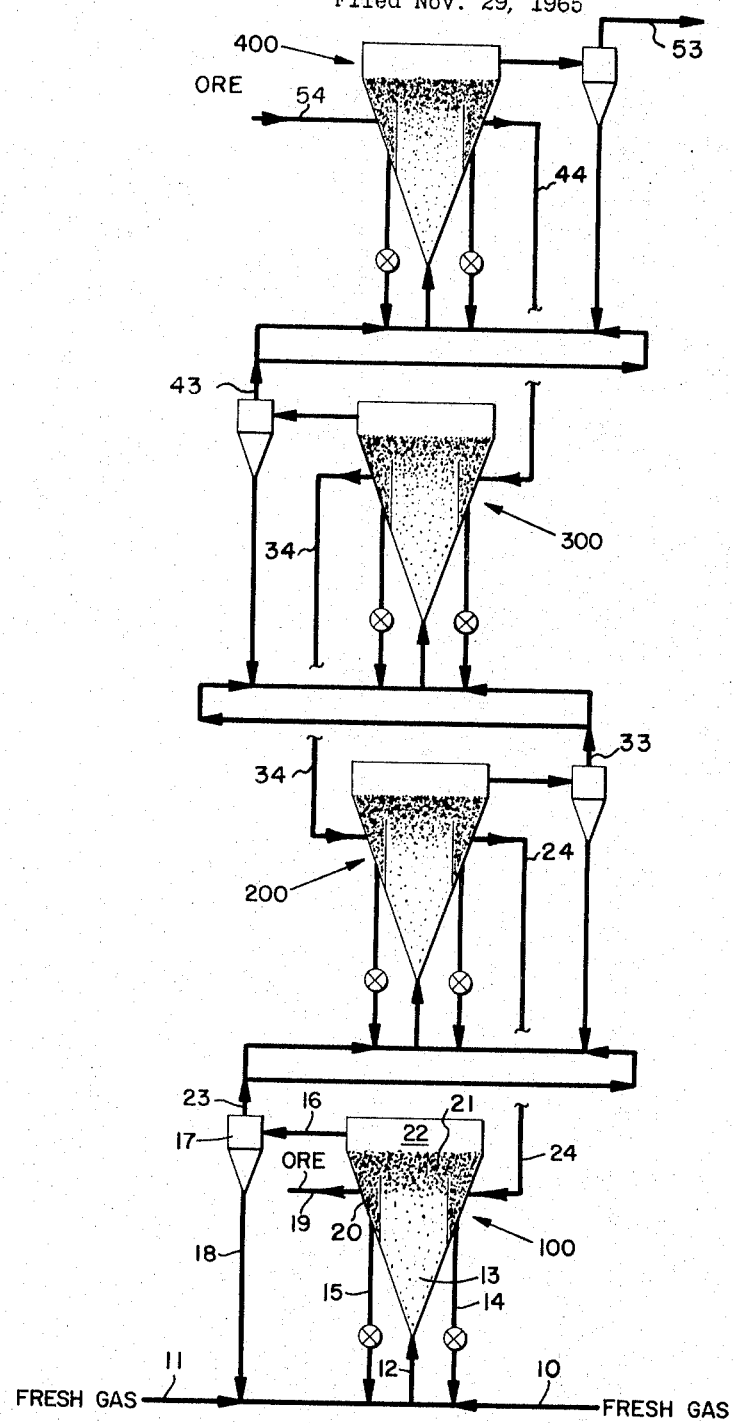

3,364,010
IRON ORE REDUCTION
Ivan Mayer, Summit, and Harvey E. W. Burnside, Locust Point, N.J., assignors to Esso Research and Engineering Company, a corporation of Delaware
Filed Nov. 29, 1965, Ser. No. 510,252
10 Claims. (Cl. 75—26)

This invention relates to the art of contacting solids with gases to produce chemical reactions. In particular, it releates to an improved method wherein iron ores, especially oxidic iron ores, are directly contacted with reducing gases, especially with hydrogen, carbon monoxide, or mixtures of these and other gases. More particularly, it relates to such processes wherein oxidic iron ores are treated in a series of contacting zones and progressively reduced and metallized.

Particulate solids are conventionally countercurrently contacted with relatively slow moving ascending gases to form fluidized beds wherein chemical reactions are conducted. To form such beds, the velocity of the ascending gas is adjusted relative to the particle sizes and densities of the solids to suspend the latter in a dense turbulent state simulating a boiling liquid. Thus, under the influence of the rising gas the solids particles move apart from one another and the beds expand until a state of dynamic equilibrium is reached. Though expanded, and possessing a definite dense phase or "pseudo-liquid" level, considerable horizontal and vertical random motion is imparted to the individual particles by the gas. The fluidized beds, in fact, take on most of the characteristics of a boiling fluid.

Fludized systems possess many desirable characteristics for carrying out chemical reactions, especially good heat transfer characteristics, but nonetheless such systems are not without serious drawbacks. In fact, fluidized systems are not readily adapted to countercurrent gas solids contacting as such to provide even the normal advantages expected of such systems. This is due largely to the great turbulence within the "pseudo-liquid" giving rise to such phenomena as the Gulf stream effect, gas bubble formation, and the like. Thus, in the fluidization there is a strong tendency for the particles to take on the characteristics of violent chaotic motion, but nonetheless some of the gas tends to channel or pass through the center of the bed, and to form spouts which fall downwardly along the sides of the bed. "Bubbles," or spheres of gases and solids in dilute phase concentrations, of generally irregular shape may form, these tending to pass through the bed providing poor gas-solids contact. Under the best of conditions, a fluidized bed is a single, perfectly mixed "stage" contact between gases and solids, but it falls short of such ideal in actual practice.

A potentially important fluidized process is one useful for the production of metallic iron from finely divided iron-bearing ores. Processes of this type are, in fact, disclosed in the prior art. In such processes, e.g., particulate oxidic iron ores, i.e., ores consisting essentially of oxides of iron, especially the higher oxides of iron, are contacted at elevated temperatures, fluidized by ascending gases, and reduced. The more sophisticated processes employ a plurality of fluidized beds, operated at the same or different elevated temperatures and the beds are staged to progressively reduce a higher oxide through its several levels of oxidation. Such series of reactions thus contemplate a stage, or stages, to effect the reduction of, e.g., ferric oxide to the magnetic oxide of iron or magnetite (or mixture aproximating such formula), the reduction of magnetite to ferrous oxide, and finally in a ferrous reduction stage, or stages, the ferrous oxide is reduced to substantially metallic iron.

The series of iron ore reduction reactions is generally carried out, e.g., in a single reactor which contains a plurality of fluid bed stages. The ore is flowed downwardly, countercurrently contacted with an ascending high temperature gas stream containing, e.g., carbon monoxides or hydrogen, or both. Sometimes all or a part of the reducing gases are generated in situ by feeding hydrocarbons directly into a ferrous reduction stage, or stages. The ore of the individual stages is thereby preheated, dehydrated, and progressively or gradually reduced, while simultaneously the reducing components of the gas are oxidized to, e.g., carbon dioxide or water, or both.

The effectiveness of a gas stream for effecting chemical reactions, e.g., a gaseous mixture of carbon monoxide and hydrogen for reducing iron ore, is limited by the nature of the reactions themselves. Thus, e.g., in the fluidized iron ore reduction process the reducing power of any gas, e.g., hydrogen or carbon monoxide, or both, is effectively limited by equilibria between the fresh reducing gas and the oxidized gas components, i.e., water or carbon dioxide, or both, in the several stages wherein the various reduction reactions occur. For example, assuming complete reaction at about 1400° F., the molar ratio of water:hydrogen is equal to about 0.475 for the reaction which occurs in a ferrous reduction zone. This means, in practical terms, that less than one-third of the available hydrogen can react with ferrous oxide under ideal gas-solids contacting conditions, even assuming an infinite reaction rate. While the reaction wherein, e.g., magnetite is reduced to essentially ferrous oxide provides a somewhat more favorable equilibrium, this reaction is also a function of the state of reduction of the ferrous oxide reduction reaction because, inter alia, the reducing power of a gas is lessened due to the formation of oxidation products in the preceding ferrous reduction zone. Overall reduction rates in fluidized iron ore reduction processes are thus limited by overall reactor performance.

It is believed that the most important limitation on many reactions, e.g., the reaction between iron ore solids are reducing gas, is due to a surface control phenomenon. Thus, it is believed that when the reducing gas, e.g., hydrogen, comes into contact with the ferrous oxide, a considerably long time is required for the gas to diffuse into and react with the ferrous oxide at the surface of the particle. This is believed due to the formation of gaseous oxidation products, e.g., water. The reaction is thus affected not only by the time required for the hydrogen to diffuse to the surface of the ferrous oxide particle, but also by the time required for the water to diffuse away from the surface of the particle.

Another limitation of such fluidized reactions is due to the slow exchange rate between the bubble phases and the emulsion phases of the gas-solids reactions. Thus, it is also known that the exchange rate between gases and solids is quite low, and gas contacting efficiencies rarely, if ever, are in excess of 40 to 50 percent even though relatively long hold-up times are provided in the reactor. In other words, the actual physical contact between reactor solids and the gas through the reactor is quite low.

In addition to these effects which apply to a variety of gas-solids fluidized processes, the fluidized iron ore reduction process is plagued by a number of other effects which adversely affect the efficiency of the process. Such reactions include that of methane synthesis and carbon monoxide reversion. In methane synthesis, gaseous mixtures of carbon monoxide and hydrogen react together to form methane. Methane synthesis not only results in inefficiency due to consumption of carbon monoxide and hydrogen, but also results in the release of carbon dioxide, which tends to further limit the effectiveness of the reducing gas. The carbon monoxide also breaks down to free carbon. Carbon deposition is extremely troublesome and gives rise to reactor fouling. In addition, carbon monoxide reversion can also give rise to catastrophic carburization, i.e., severe carburization of catalytic metal surfaces, e.g., ferrous metal surfaces, of which the reactor and auxiliary equipment are generally composed.

Other problems in iron ore reduction processes include such phenomena as bogging, i.e., a sticking together of the iron ore solids particles, which problem is prevalent in the ferrous reduction zone. The problem is especially severe as the degree of metallization increases, and is intensified by using high hydrogen concentrations in the reducing gas. Not the least troublesome of such problems includes that of supplying sufficient heat for the reduction reactions to proceed. Though fluidized iron ore reduction processes are widely disclosed in the art, insofar as presently known, not a single fluidized iron ore reduction process has been successfully developed to the point of providing a successful commercial operation.

The present invention seeks to obviate many of the prior art problems, and has for its primary objective the achievement of a new and improved process which will provide more efficient contact between gases and solids in producing chemical reactions. In particular, it is an objective to provide a new, simplified and improved process for treating particulate solids, especially particulate iron ore solids, at utmost efficiency. More specifically, it is an objective to provide such process wherein oxidic iron ores at high levels of oxidation can be successively treated with a reducing gas, or gases, in a series of staged reaction zones to produce metallic iron.

These and other objects are achieved in accordance with the present invention which contemplates a method for contacting together particulate solids and gases to provide, in a given stage, a combination of mixing and settling steps which assures a very high order of efficiency in carrying out chemical reactions. Preferably, the total operation contemplates a series of stages.

In a given stage a sequence of steps is provided wherein particulate solids are first contacted and transported in dilute phase by upwardly flowing gases moving at a velocity greater than the free fall velocity of the individual particles. A dense phase fluidized zone is located adjacent the dilute phase zone. To form such zone, the velocity of the gas can be lessened so that both gases and solids are fluidized in a dense phase bed. Preferably, the velocity of the gases is gradually lessened in flowing from the bottom to the top of the fluidized bed to produce an increase in the density at the top of the fluidized gas-solids bed. At the top of the bed, gases are released and the solids particles are then drawn off and settled. The settled particles are thence picked up by fresh gas and recycled through the same sequence of steps.

In accordance with this sequence of steps, the individual solids particles are contacted in a first zone with gases ascending at high linear velocities, or velocities wherein the downward velocity component of the solids particles is less than that of the upward velocity component of the moving gases. The resulting effect is that the particulate solids are swept upwardly in dilute phase by the countercurrently moving gases, this treatment providing far greater and more efficient contact between the surfaces of the particulate solids and gases than achieved in conventional fluidized solids processes. Moreover, the surfaces of the moving particles are continuously subjected to relatively fresh volumes of gas.

As the particulate solids are swept upwardly, the gas velocity can be diminished so that the gas and solids form a contiguous dense phase fluidized bed. Moreover, as the gases continue their upward path of travel, the velocity thereof can be further gradually reduced to provide a fluidized bed with an inverse density gradient. The effect of gradual reduction in gas velocities is thus to provide a fluidized bed ranging from one of relatively low density at the bottom to one of greatest density at the top of the bed. The fluidized bed contiguous to the dilute phase treating zone prevents escape of substantial quantities of the particulate solids. Moreover, the fluidized bed assures sufficient residence or contact time between solids and gases to achieve the desired degree of chemical reaction. Substantially complete equilibrium between the gas and solids phases can generally be provided. Further, as the solids move upwardly from the bottom to the top of the fluidized bed, the denser beds extract the spent gas from the solids.

From the top of the dense phase fluidized zone the solids particles are "overflowed" to a settling zone or zone of very high density. In the settling zone, the concentration of solids approaches its ultimate density, i.e., a cubic foot of solids particles containing little or no occluded gas. Thus, residual gases are substantially completely removed by the pressure of settling. A stripping gas can be added to the settling zone to assure more complete removal of spent gases, if desired. While an inert gas can be used, it is generally preferable to use fresh gas of the type used in effecting the chemical reactions.

Upon settling, the particulate solids are then picked up by fresh gas and reintroduced into the said initial dilute phase zone. A feature of the invention resides in the very high number of reintroductions of solids through the stage.

The present method, in the total sequence of steps constituting a stage, or several stages, guarantees positive and more efficient contacting of the gases with particulate solids. There is a minimum chance of the gas bypassing, as in the bypassing of the emulsion phase of fluidized solids systems generally. In addition, excellent removal of spent gases from the dense phase or emulsion is assured. Moreover, there is provided a definite path of particulate solids circulation through the system to assure more highly effective back-mixing. Intimate contacting will prevail, and the system will approach a piston flow operation of solids and gases. In a conventional fluidized solids system, even if the surfaces are provided adequate contact time to achieve completion of the desirable reaction, the interior of the solids particles are rarely, if ever, completely reacted. This, as suggested, is because the gases must diffuse through the outer surfaces of the particles and, also, the products of reaction must diffuse outwardly. Also, the actual physical contact between solids and gases is relatively low. In accordance with the present invention, however, the solids are subjected to gases moving at relatively high velocities and diffusion into and out of the particles is far more rapid, and the individual surfaces are constantly exposed to fresh or unreacted gases. Moreover, actual physical contact between gases and solids is quite high. In the fluidized bed the solids are subjected to an "inverted" density gradient, adequate time being allowed to essentially complete gas-solids equilibrium and separation of the solids from the gases without disturbance of such equilibrium. Contact of the already treated solids with fresh gas conducts a given reaction to the ultimate degree.

In a particularly preferred embodiment of this invention, particulate iron ores, especially oxidic iron ores, are reduced in a series of reduction reactions. In an initial stage, or sequence of stages, the oxidic iron ore, e.g., ferric oxide, is reduced to magnetite, i.e., magnetic oxide of iron, or mixture approximating such formula. In a succeeding stage, or sequence of stages, the magnetite is reduced to ferrous oxide, and finally, in another stage, or sequence of stages, ferrous oxide is reduced to substantially metallic iron. The reactions can be conducted at atmospheric or super-atmospheric pressure, and preferably the latter. Generally, pressure ranging from about 50 to about 1000 pounds per square inch, and more preferably from about 50 to about 200 pounds per square inch, are provided. Each of the several stages can be operated at the same or at different elevated temperatures ranging generally from about 1000° F. up to the sintering temperature of the ore, this being generally about 1800° F. for most ores. Preferably, however, the reactions in the individual stages are carried out at different elevated temperatures. An ore consisting essentially of ferric oxide is reduced at temperatures ranging generally from about 600° F. to about 1600° F., and preferably from about 1200° F. to about 1400° F. Magnetite is generally reduced at temperatures ranging from about 1000° F. to about 1500° F., and preferably at temperatures ranging from about 1200° F. to about 1400° F. The temperature for the ferrous reduction generally ranges from about 1200° F. to about 1700° F., and preferably from about 1300° F. to about 1500° F. Preferably, at least three individual stages are provided, these including ferric reduction stages wherein ferric oxide is reduced to magnetite, and a stage where magnetite is reduced to ferrous oxide, respectively. Preferably, also, a plurality of ferrous reduction stages are employed. More preferably, two stages are employed. In an initial ferrous reduction stage, it is preferable to reduce the ore to a product providing from about 50 to about 85 percent metallization and, in the final ferrous reduction stage, from about 85 to about 95 percent metallization.

The invention will be better understood by reference to the following schematic diagram or figure and to the accompanying detailed description which makes specific reference to the figure.

Referring to the figure there is shown a reaction vessel 400 and a series of similar reaction vessels 300, 200, 100 stacked one on top of another, though obviously the principle of operation would be no different if the individual reactors were arranged horizontally in series. Insofar as apparatus, and apparatus function, is concerned, each of the several reaction vessels is identical and hence only one reaction vessel 100 of the series need be described in detail.

In the processing of, e.g., oxidic iron ores wherein ore is progressively reduced through several oxidation levels, the reaction is preferably conducted in several stages. In any initial or preceding stage, the spent gas from a lower reactor serves as a feed to the next reactor of the series. The ore and gas move countercurrently one to the other in the overall treatment, and the feeds are so arranged that the fresher reducing gas contacts ore at the higher levels of reduction. Conversely, the partially spent gas contacts ore at the higher levels of oxidation. Reducing gas thus enters reactor 100 via lines 10, 11 and is contacted with ore at the highest level of metallization. Partially spent reducing gas from reactor 100 is removed therefrom via line 23 and introduced into reactor 200. Gas from reactor 200 is removed via line 33 and introduced into reactor 300, and gas from reactor 300 is removed therefrom via line 43 and introduced into reactor 400, into which fresh ore is introduced. Spent gas from reactor 400 is removed via line 53. The gas can be regenerated by conventional means and then reintroduced to the process with the fresh gas, if desired.

Ferric oxide, or a hydrated form thereof, is introduced into reactor 400 via line 54 where it is dehydrated, preheated and converted to magnetic oxide of iron. The product from reactor 400 is introduced via line 44 into reactor 300 wherein it is reduced to substantially ferrous oxide. The ferrous oxide is then introduced via line 34 into reactor 200 wherein it is further reduced to a product ranging from about 50 to about 85 percent metallization. This product is withdrawn via line 24 and introduced into reactor 400, the lowermost reactor of the series. Iron ranging from about 85 to about 95 percent metallic iron is withdrawn from reactor 400 via line 19.

Referring specifically to the figure and to reactor 100, the lowermost reactor of the series, is provided a tubular section or dilute phase riser 12 providing a reaction zone into which particulate ore is swept by gases entering the reactor via lines 10, 11. The gases enter riser 12 at velocities ranging at least about 30 feet per second, and generally ranges as high as about 150 feet per second. Preferably, especially in treating iron ores, the velocity ranges from about 60 feet per second, and more preferably, from about 80 feet per second to about 120 feet per second. Fresh ore is introduced into the settling zone 20 of reactor 100 via line 24 to dipleg 14 from whence it enters line 10 and is picked up and carried in dilute phase by the entering high velocity gas stream.

By means of this initial gas treatment, which in a sense is both concurrent and countercurrent, extremely good contact is made between the entering gases and solids, and reaction rate is generally quite rapid. In treating iron ores in the dilute phase riser 12, it is preferable to provide a contact time ranging from about .1 to about 2 seconds, and preferably from about .5 to about 1 second.

The solids are thence carried upwardly into the conic section or zone 13. The conic opening, since it flares gradually outwardly, causes the velocity of the gas to slow down. As the gases and solids rise into zone 13, and as the velocity of the gases slow to not more than about 20 feet per second, and generally within the range of from about 10 to about 15 feet per second, a fluidized phase is formed. The density of the fluidized phase gradually increases as the gas-solids systems move upwardly into the upper portion of zone 13 and into zone 21 near the top of the bed.

Within zone 13, where iron ores are processed, the density of the fluid bed at the bottom ranges generally from about 5 to about 50 pounds per cubic foot, and preferably from about 5 to about 30 pounds per cubic foot. At the top of the zone, the density ranges generally from about 50 to about 110 pounds per cubic foot, and preferably from about 50 to about 70 pounds per cubic foot. In zone 21, especially near the top of the bed, the density ranges generally from about 110 pounds per cubic foot and higher, and can approach 150 pounds per cubic foot. Preferably, the density at the top of the bed (zone 21) ranges from about 8 to about 16 times the density at the bottom of the bed (zone 13), and more preferably from about 10 to about 12 times the density at the bottom thereof. For iron ores it is generally satisfactory to provide a total solids hold-up time ranging from about .1 to about 2 hours, and preferably from about .2 to about 1 hour to assure complete solids reaction with minimum fresh gas requirements.

Within the upper portion of reactor 100 is provided a disengaging space or stripping section 22 from whence the solids are substantially completely separated from the gases. The bulk of the solids spill over into the zone 20 and flow downwardly through diplegs 14, 15 while the gases exit from the disengaging space via line 16 to cyclone separator 17. The solids are settled into the top of diplegs 14, 15 and, after settling, the bulk thereof is reintroduced into lines 10, 11, picked up by the entering fresh gas, and reintroduced to the dilute phase riser 12. Also, solids separated from cyclone 17 gravitate downwardly through dipleg 18, enter line 11, and are recycled to the dilute phase riser 12. Gases from cyclone 17 ascend via line 23 to the next reaction vessel of the series, i.e., reactor 200. Product is withdrawn from reactor 100 via line 19.

In the diplegs 14, 15 the density of the solids tends to approach more closely the bulk density of solids due to the exclusion of gases. Generally, the density of the treated iron ore solids ranges from about 80 pounds per cubic foot to about 190 pounds per cubic foot, and preferably from about 130 pounds per cubic foot to about 160 pounds per cubic foot.

It is apparent that a single reactor can be employed, or a plurality of reactors can be used in series. The choice is governed by the kind of reaction, or reactions, to be conducted. Where, e.g., a compound is to be reduced through several oxidation stages, as in the reduction of oxidic iron ores, it is preferable to employ a series of reactors. In reducing iron ores, it is generally preferable to employ a series of at least three, and preferably from about four to about six reactors in series. In the latter case, the total operation more closely approaches a piston flow operation.

A feature of the invention resides in the use of a very high solids recycle in any given stage. By high recycle in a given stage, the solids can be continually exposed to dilute phase reaction in the riser. For iron ore it is generally desirable to recycle the solids from at least about 1000 to about 20,000 times, and more preferably from about 5000 to about 15,000 times, through the dilute phase during its residence in the system. It is the high recycle and high exposure of solids to gases at high velocities to provide good contacting to which the overall success of the operation can be attributed.

Ideally, it is desired to maintain the density of the solids-gas systems in the dilute phase riser at a minimum level, and the density of the solids-gas system in the settling zone at a maximum. This assures best gas-solids contact and removal of gases from the solids at any given recycle rate.

The following tabulation shows the number of times solids of similar particle sizes must be recycled or "turned over" to substantially completely reduce ferrous oxide to metallic iron. Three examples are given, and in each the density of the settled solid is maintained at 150 pounds per cubic foot while the density of the dilute phase is, given in pounds per cubic foot, varied. It will be apparent that the lower densities in the dilute phase riser achieve maximum efficiency of reduction and impose a superior ability to eliminate spent gases from the solids. Conversely, operation at high dilute phase densities imposes a restriction on the ability to eliminate spent gases from the solids and consequently the efficiency of the system is lessened.

| Example No. | 1 | 2 | 3 |
| --- | --- | --- | --- |
| Riser Density (Pounds per cubic foot) | 100 | 60 | 20 |
| Circulation Rate (pounds per minute): | | | |
| One Hour Reduction | 152,500 | 50,500 | 11,640 |
| Ten Hour Reduction | 15,250 | 5,050 | 1,164 |
| Turnover per Mole of Ferrous Oxide Reduced | 17,750 | 5,682 | 1,360 |

From the above, then, it is apparent that practical circulation rates are more readily achieved by low dilute phase densities.

Having described the invention, what is claimed is:

1. In the stage of a process for conducting a chemical reaction between particulate solids and gas, the combination of steps comprising
    contacting the solids with gas moving at velocities ranging from about 30 to about 150 feet per second, and greater than the free fall velocity of the solids, to form a dilute gas-solids phase wherein gas and solids are reacted,
    feeding the dilute gas-solids into a contiguous fluidized gas-solids phase,
    settling the solids, separating the gas, and then recycling the solids to the dilute gas-solids phase from about 1000 to about 20,000 times during the residence of the solids in the stage.

2. The process of claim 1 wherein the dilute gas-solids phase is formed by gases moving at velocities ranging from at least about 60 feet per second to about 120 feet per second.

3. The process of claim 1 wherein the fluidized gas-solids system forms a bed which is gradually displaced upwardly from a location of low density to a location of high density, the density in the lower portion of the bed ranging from about 5 to about 50 pounds per cubic foot and the density in the upper portion of the bed ranging from about 50 to about 110 pounds per cubic foot.

4. The process of claim 1 wherein the reaction is conducted in a series of stages.

5. The process of claim 1 wherein the particulate solids are iron ore.

6. The process of claim 5 wherein the solids are particulate oxidic iron ore, the particulate ore solids are contacted with gas moving at velocities ranging from about 30 to about 120 feet per second, and at velocities greater than the free fall velocity of the solids, to form a dilute gas-solids phase wherein gas and solids are reacted,
    the particulate ore is fed to a fluidized gas-solids phase within which the fluid solids system is gradually displaced upwardly from a location of low density ranging from about 5 to about 50 pounds per cubic foot, to a location of high density ranging from about 50 to about 110 pounds per cubic foot,
    separating the gas and settling the iron ore solids at densities to about 190 pounds per cubic foot, and wherein
    the particulate iron ore solids are recycled to the dilute gas-solids phase from about 5,000 to about 15,000 times during the time of residence in the stage.

7. The process of claim 6 wherein the particulate iron ore solids are contacted with gas moving at velocities ranging from about 60 feet per second to about 120 feet per second.

8. The process of claim 6 wherein the density gradient between the upper portion of the fluidized gas-solids phase ranges about 8 to about 16 times the density of the lower portion of the fluidized gas-solids phase.

9. The process of claim 6 wherein the ore is reduced in a series of stages to substantially metallic iron.

10. The process of claim 9 for producing metallic iron from particulate oxidic iron ores by
    contacting ferric oxide in an initial stage to produce magnetite,
    contacting magnetite in a succeeding stage to produce ferrous oxide,
    and then reducing ferrous oxide in a succeeding stage to substantially metallic iron.

No references cited.

BENJAMIN HENKIN, *Primary Examiner.*